United States Patent
Kuntz et al.

[11] Patent Number: 6,132,504
[45] Date of Patent: Oct. 17, 2000

[54] MULTILAYER INTERFERENCE PIGMENT WITH ABSORBENT CENTRAL LAYER

[75] Inventors: Matthias Kuntz, Seeheim; Gerhard Pfaff, Münster; Gerd Bauer, Klein-Ostheim; Christina Schank, Mühltal, all of Germany

[73] Assignee: Merck Patent Gesellschaft mit Berschrankter Haftung, Germany

[21] Appl. No.: 09/171,782

[22] PCT Filed: Feb. 18, 1998

[86] PCT No.: PCT/EP98/00931

§ 371 Date: Oct. 26, 1998

§ 102(e) Date: Oct. 26, 1998

[87] PCT Pub. No.: WO98/38255

PCT Pub. Date: Sep. 3, 1998

[30] Foreign Application Priority Data

Feb. 27, 1997 [DE] Germany ............ 197 07 805

[51] Int. Cl.[7] .................................... C09C 1/62
[52] U.S. Cl. ............... 106/404; 106/415; 106/417; 106/453; 106/454; 106/472; 427/216; 427/217; 427/255.15
[58] Field of Search .............. 106/404, 415, 106/417, 425, 435, 436, 450, 453, 454, 456, 472; 427/216, 217, 249.4, 255.11, 255.15

[56] References Cited

U.S. PATENT DOCUMENTS

| | | | |
|---|---|---|---|
| 3,138,475 | 6/1964 | Schroder et al. | 106/415 |
| 3,767,443 | 10/1973 | Clark et al. | 106/415 |
| 4,434,010 | 2/1984 | Ash . | |
| 4,882,133 | 11/1989 | Saegusa | 423/335 |
| 5,026,429 | 6/1991 | Mronga et al. . | |
| 5,266,109 | 11/1993 | Voelker et al. | 106/459 |
| 5,624,486 | 4/1997 | Schmid et al. | 106/404 |
| 5,670,096 | 9/1997 | Lu | 264/1.1 |
| 5,766,335 | 6/1998 | Bujard et al. | 106/404 |
| 5,858,078 | 1/1999 | Andes et al. | 106/437 |
| 5,922,465 | 7/1999 | Gailberger et al. | 428/407 |

FOREIGN PATENT DOCUMENTS

| | | |
|---|---|---|
| 381047 | 8/1990 | European Pat. Off. . |
| 668329 | 8/1995 | European Pat. Off. . |
| 9308237 | 4/1993 | WIPO . |

OTHER PUBLICATIONS

English Abstract of WO 9308237.

*Primary Examiner*—Robert H. Harrison
*Attorney, Agent, or Firm*—Millen, White, Zelano & Branigan, P.C.

[57] ABSTRACT

Multilayer interference pigment consisting of a central, absorbing layer and alternating layers of a material of low refractive index and of a metal or of a material of high refractive index either side of the central layer, the material of low refractive index preferably being acrylate and the metal being aluminium or chromium. The absorbing layer consists of a coating system which comprises carbon black or color-imparting absorption pigments.

19 Claims, 3 Drawing Sheets

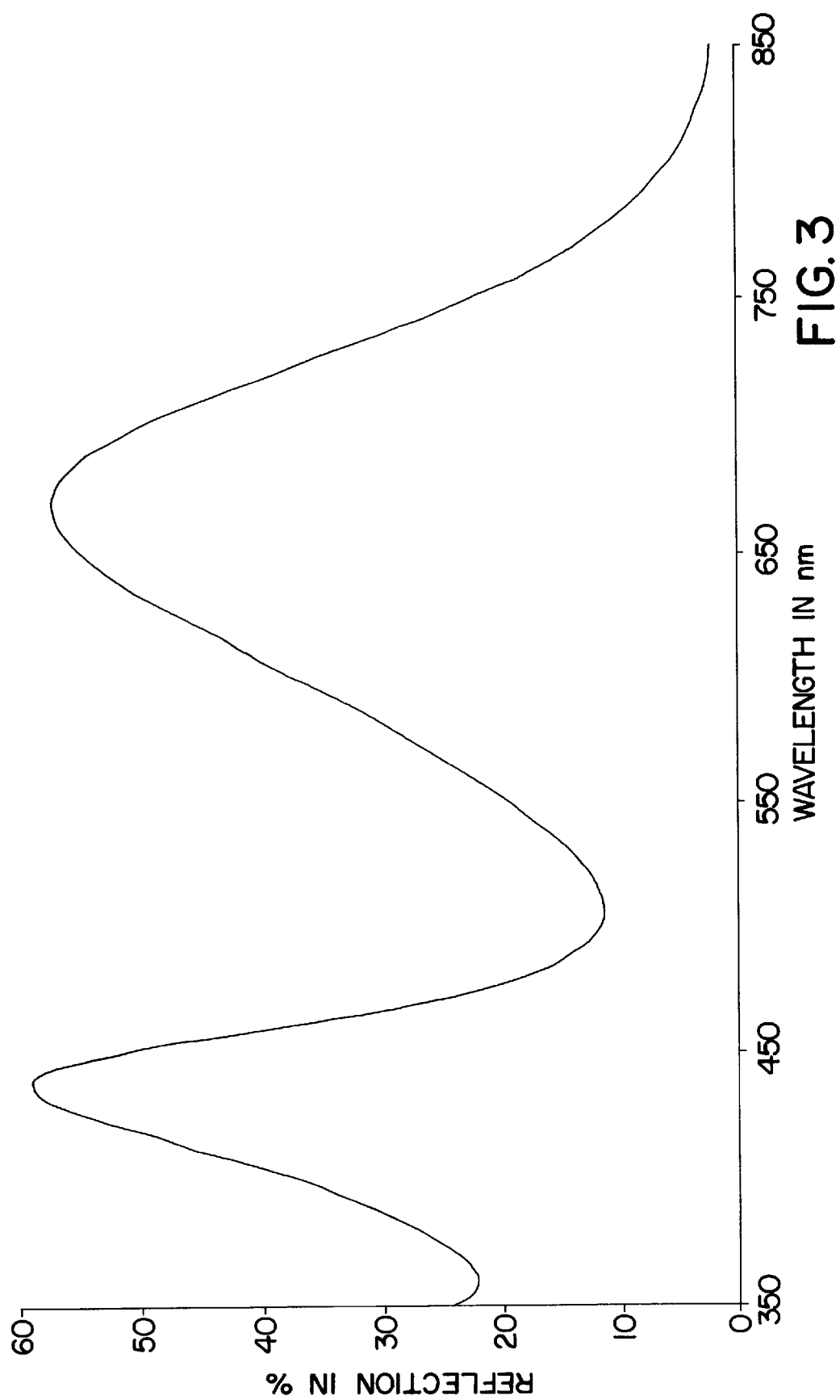

MULTILAYER INTERFERENCE PIGMENT WITH ABSORBENT CENTRAL LAYER

The invention relates to multilayer interference pigments consisting of alternating layers of a material of low refractive index and of a metal or of a material of high refractive index, the central layer being formed from an absorbing material.

Multilayer pigments having alternating layers of a material of high refractive index and a material of low refracting index are known. They comprise predominantly metal oxides. However, the material of high refractive index can also be replaced by a semitransparent metal layer. The metal oxide layers are produced either by a wet method, by precipitating the metal oxide hydrates from a metal salt solution onto a substrate material, or by vapor deposition or sputtering in a vacuum. For instance, U.S. Pat. No. 4,434,010 describes a multilayer interference pigment consisting of a central layer of a reflective material (aluminium) and alternating layers of two transparent, dielectric materials of high and low refractive index, for example titanium dioxide and silicon dioxide, either side of the central aluminium layer. In a further embodiment of the pigment the layers following the central aluminium layer are formed by magnesium fluoride and chromium. This pigment is employed for the printing of securities.

JP H7-759 (A) describes a multilayer interference pigment with a metallic luster. It consists of a substrate which is coated with alternating layers of titanium dioxide and silicon dioxide. The substrate is formed from platelets of aluminium, gold or silver, or from platelets of mica and glass which are coated with metals.

All types of pigment having a metal layer as the central layer have the disadvantage that every wavelength is reflected from this reflection layer, with the effect that, although a high luster is obtained, the actual interference color is at the same time masked.

The object of the invention is to provide an interference pigment having strong interference colors, a close angular dependency of the interference colors, and a high hiding power.

This object is achieved according to the invention by a multilayer interference pigment consisting of a central layer of an absorbing material and alternating layers of a material of low refractive index and of a metal or of a material of high refractive index either side of the central layer.

This object is also achieved, according to the invention, by a process for preparing the novel pigment by applying a release layer comprising a water- or solvent-soluble material to a substrate, depositing a layer system comprising alternating layers of a material of low refractive index and of a metal or of a material of high refractive index onto the release layer, the central layer applied being a layer of an absorbing material, removing the layer system formed from the substrate by dissolving the release layer, and washing and drying the resulting platelet-shaped interference pigment, heat-treating the pigment in a stream of nitrogen at from 100 to 300° C., and milling and classifying the treated pigment.

The invention also provides for the use of the novel pigments for pigmenting paints, printing inks, plastics and cosmetics and for producing films.

The material of high refractive index is a metal oxide or mixtures of metal oxides with or without absorbing properties, for example $TiO_2$, $ZrO_2$, $Fe_2O_3$, $Fe_3O_4$, $Cr_2O_3$ or ZnO, or a compound of high refractive index, for example iron titanates, iron oxide hydrates or titanium suboxides or mixtures and/or mixed phases of these compounds with one another or with other metal oxides.

The metal is preferably aluminum, chromium, nickel, a chromium-nickel alloy or silver. Chromium and aluminum are preferred in this context, since they are easy to deposit. Furthermore, the layers here have a reflectivity which is easy to control and high corrosion resistance. Metal layers are preferred over layers of a material of high refractive index.

The material of low refractive index is $MgF_2$ or a metal oxide such as $SiO_2$, $Al_2O_3$ or a mixture thereof, and can likewise have absorbing or nonabsorbing properties. If desired, the material of low refractive index can include alkali metal oxides and alkaline earth metal oxides as constituents.

As the material of low refractive index, however, it is preferred to employ polymers, for example acrylates. The monomers used have a molecular weight of from 200 to 1000 and are available as mono-, di- or triacrylates. In terms of functional groups they are available as hydrocarbons, polyols, polyethers, silicones or as fluorinated Teflon-like monomers. These monomers can be polymerized by means of electron beams or UV radiation. The resulting layers possess temperature stability up to 250° C. The refractive indices of the acrylate layers are in the range from 1.35 to 1.60. Further details can be found in David G. Shaw and Marc G. Langlois: Use of a new high speed acrylate deposition process to make novel multilayer structures, MRS Conference in San Francisco in 1995; A new high speed process for vapor depositing fluoro and silicone acrylates for release coating applications, Conference of the Society of Vacuum Coaters in Chicago, Ill., 1995.

The absorbing middle layer consists of a conventional coating system which comprises carbon black or colour-imparting absorption pigments or mixtures thereof. A preferably used coating system, which adheres well to metal layers, is an acrylate-melamine resin.

Alternatively, the absorbing middle layer can consist of materials of high or low refractive index which contain metals. Examples of these are magnesium fluoride or silicon monoxide which contain chromium, or titanium monoxide which likewise contains chromium. These layers are produced by vapor deposition or sputtering in a vacuum and are state of the art. The density of the absorption layer is between 50 nm and 2 $\mu$m.

The difference in refractive indices between a layer of high refractive index and a layer of low refractive index should be at least 0.1.

The layer thickness of the layers of low refractive index is adjusted to values of between 20 nm and 700 nm, preferably between 60 nm and 500 nm. The layer thickness of the metal layers is adjusted to 5 to 20 nm in order to give semitransparency.

The maximum achievable reflection possible with a multilayer system depends on the number of layers and on the refractive indices of the layers:

$$R = \left[\frac{1 - (n_H/n_L)^{2P} n_H^2}{1 + (n_H/n_L)^{2P} n_H^2}\right]^2$$

In this formula, $n_H$ is the refractive index of the high-index layer, $n_L$ is the refractive index of the low-index layer, and P is the number of layers (layer count). This equation is valid for a layer count of 2p+1.

The layer thickness for maximum reflection is in each case $d=\lambda/4n$ or a multiple thereof with the wavelength $\lambda$. The thickness and number of layers depends on the desired effect in terms of interference colour and angular dependence of the interference colour. $\lambda$ varies within the range between 400 nm (violet light) to about 750 nm (red region). In order to obtain appropriate colours, the layer thickness must be adjusted in accordance with the refractive index of the optically thinner medium. In addition, the novel pigments can also be used to produce appropriate pigments which reflect selectively in adjoining wavelength regions (UV—infrared).

In precision optics, for example in the production of mirror layers, beam splitters or filters, layer counts of up to 100 or more are employed. Layer counts of this magnitude are not necessary for the preparation of pigments. The number of layers is normally below 10.

The individual layers are produced in accordance with known techniques by sputtering of metals, for example of aluminum or chromium or of alloys, for example Cr—Ni alloys, and of metal oxides, for example titanium oxide, silicon oxide or indium-tin oxide, or by thermal vaporization of metals, metal oxides or acrylates.

For preparing the novel pigments preference is given to vacuum strip coating, as is described in U.S. Pat. No. 5,440,446 for the production of high-voltage capacitors and in EP 0 733 919 for the production of interference color filters.

The substrate used for the interference layer system is a flexible strip of polyethylene terephthalate (PET), other polyesters, polyacrylates, polyethylene (PE) or polypropylene (PP).

The release layer which is applied to the substrate in order to enable the interference layer system to be detached from the flexible strip after deposition has taken place consists of a water- or solvent-soluble material, for example polyethylene glycol, wax or silicone. The solvent used is water or acetone.

In the text below, the application of the interference layers by vapor deposition is described in more detail:

In the vapor deposition technique, the substances to be vaporized are heated in a vacuum and vaporized. The vapors condense on the cold substrate surfaces, giving the desired thin layers. Vaporization takes place either in metal containers (boats of tungsten, molybdenum or tantalum metal sheet), which are heated directly by passage of a current, or by bombardment with electron beams.

The interference layer system can be prepared using a conventional strip vapor deposition unit. The vapour deposition unit consists of the customary components, such as vacuum boiler, vacuum pump system, the pressure meters and control units, vaporizer devices, such as resistance vaporizers (boats) or electron beam vaporizers, a layer thickness measurement and control system, a device for establishing defined pressure conditions, and a gas inlet and regulation system for oxygen.

The high-vacuum vapor deposition technique is described in detail in Vacuum-Beschichtung, Volumes 1–5; Editors Frey, Kienel and Löbl, VDI Verlag 1995.

Application of the layers by sputter technique is as follows:

In the case of the sputtering technique or in the case of cathode atomization, a gas discharge (plasma) is ignited between the substrate and coating material (target) which is in the form of plates. The coating material is bombarded with high-energy ions from the plasma, for example argon ions, and is thereby abraded or atomized. The atoms and molecules of the atomized coating material are deposited on the substrate and form the desired thin layer.

Metals or alloys are particularly suitable for sputtering techniques. They can be atomized at comparatively high rates, especially in the so-called DC magnetron process. Compounds such as oxides or suboxides or mixtures of oxides can likewise be atomized using high-frequency sputtering. The chemical composition of the layers is determined by the composition of the coating material (target). However, it can also be influenced by adding substances to the gas which forms the plasma. Oxide or nitride layers, in particular, are produced by addition of oxygen or nitrogen to the gas space.

The structure of the layers can be influenced by means of appropriate measures, such as bombarding the growing layer by ions from the plasma.

The sputtering technique is likewise described in Vacuum-Beschichtung, Volumes 1–5; Editors Frey, Kienel and Löbl, VDI Verlag 1995.

The principle of the application technique of metal and polymer layers is described in U.S. Pat. No. 5,440,446 and EP 0 733 919 and is practised as follows:

The whole coating unit is located within a conventional vacuum chamber 1. A strip 3 of polyester is wound up on a dispensing roller 2 and already carries a release layer on one side. The polyester strip 3 is guided via a rotating drum 4 and wound up onto the acceptor roller 5. Rollers 6 and 7 serve as tension and guide rollers.

The strip passes through the metalizing station 8, where a semitransparent metal layer is deposited by vacuum vapor deposition or sputtering. The strip then passes through the high-speed vaporizer 9. In the vaporizer there is a gaseous acrylate monomer which is deposited as a thin layer on the metal layer that is located on the substrate strip. The strip then passes through an irradiation station 10 where it is irradiated with electrons or with ultraviolet light. The irradiation initiates the polymerization of the acrylate monomer. The strip subsequently passes through the second metalizing station 11. After this the strip, which is coated with two semitransparent metal layers and an acrylate layer in between them, and after passing tension roller 7, is wound up, and the absorbing metal layer is applied in a conventional strip coating unit outside the vacuum unit.

The absorbing middle layer is applied, for example, by application of a conventional coating system which comprises carbon black or color-imparting absorption pigments or mixtures thereof, by means of a patterned roller or by spraying or knife coating. Other transfer and printing techniques are also suitable for this process step.

By adjusting the thickness of the middle layer and the concentration of the printing ink it is also possible to make a distinction between middle layers of low transparency and middle layers which are completely absorbing.

The strip subsequently passes a second time through the vacuum unit, where the metal layers and the acrylate layer are deposited in the same way as during the first pass.

For a 7-layer system consisting of a central absorption layer and two metal layers and an acrylate layer on either side of the central layer, two passes through the vacuum coating unit are required, the absorbing middle layer being applied after the first pass.

After the coating operation, the multiple coating is detached by dissolving the release layer in a water bath, possibly at a relatively high temperature, or in a solvent, possibly at a relatively high temperature, by brushing, scraping or, preferably, by washing.

Where acrylates are used as the material of low refractive index it is necessary to grind the pigment at relatively low temperatures in the range from 90 to 273 K.

BRIEF DESCRIPTION OF DRAWINGS

FIGS. 2 and 3 represent reflection spectra of pigments in accordance with the invention.

The examples which follow are intended to illustrate the invention.

EXAMPLE 1

Figure 1:
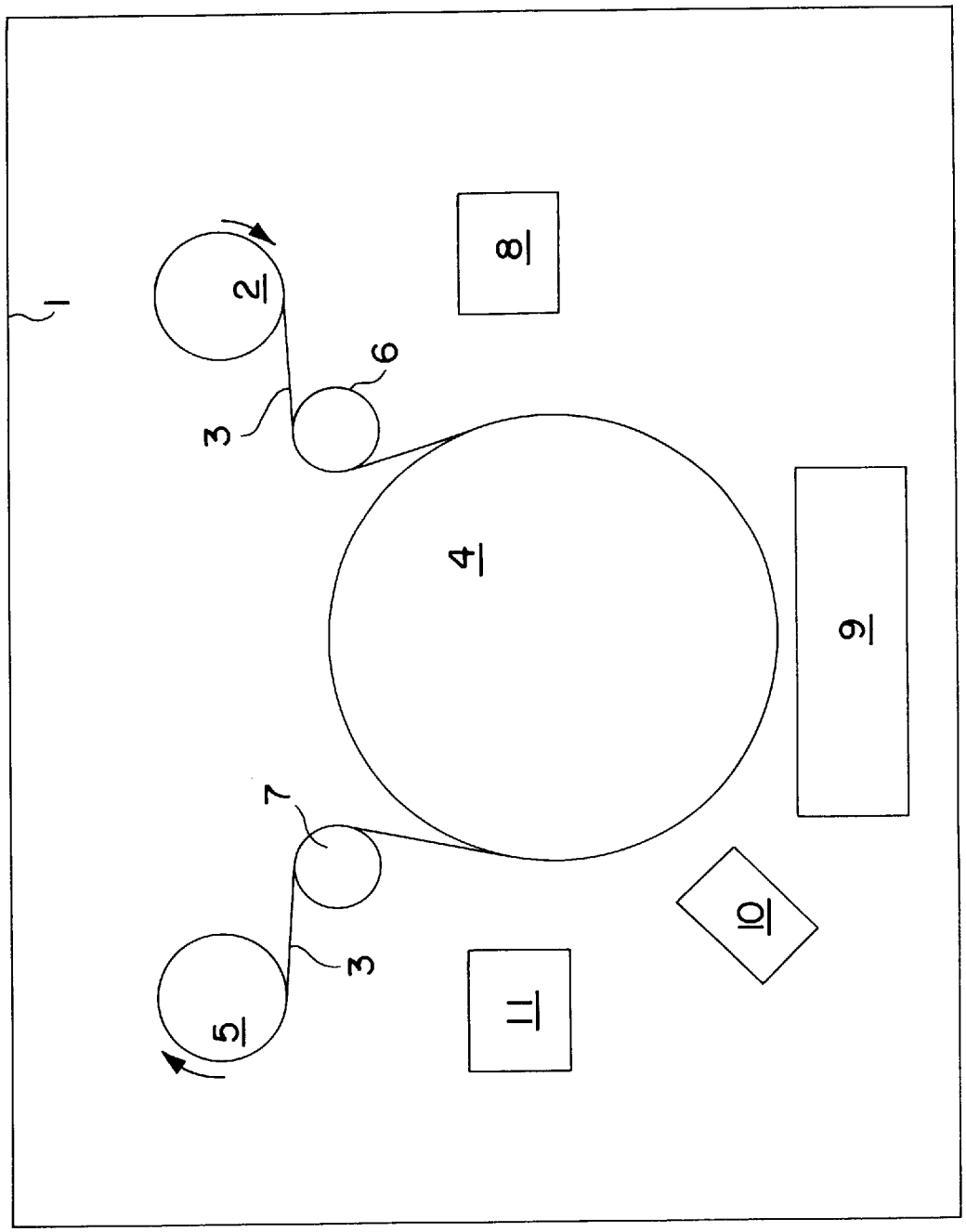
FIG. 1 represents a vacuum vapor deposition unit for use in accordance with the invention.

An interference pigment consisting of seven layers is produced by alternate vapor deposition of chromium or aluminum and acrylate onto a polyester strip in a vacuum vapor deposition unit in accordance with FIG. 1. The polyester strip is coated with a release layer of stearin. Following the application of one chromium, one acrylate and one aluminum layer, the strip is removed from the unit and the absorbing middle layer is applied to the aluminum layer by knife coating in a conventional strip coating unit. This central layer consists of a UV-curable acrylate-melamine resin containing carbon black in dispersed form. The strip then passes a second time through the vacuum unit, where the metal layers and the acrylate layer are deposited in the same way as during the first pass.

Layer structure of the pigment

| Layer No. | Material | Layer thickness nm |
|---|---|---|
| 1 | chromium | 12 |
| 2 | acrylate | 275 |
| 3 | aluminium | 15 |
| 4 | resin layer with carbon black | 1500 |
| 5 | aluminium | 15 |
| 6 | acrylate | 275 |
| 7 | chromium | 12 |

The layer system is detached from the substrate strip using acetone, is washed with acetone and is dried. Subsequently the resulting pigment is heated at 300° C. in a stream of nitrogen for 90 minutes and is then comminuted to a particle size of from 20 to 40 μm in a Netsch mortar mill for 30 minutes, mixed with carbon dioxide dry ice, at from −5 to −10° C.

EXAMPLE 2

An interference pigment consisting of seven layers is produced by alternate vapor deposition of chromium and acrylate onto a polyethylene terephthalate (PET) strip in a vacuum vapor deposition unit in accordance with FIG. 1. The PET strip is coated with a release layer of stearin. Following the application of two chromium layers and one acrylate layer, the strip is removed from the unit and the absorbing middle layer is applied to the second chromium layer by knife coating in a conventional strip coating unit. This central layer consists of a UV-curable acrylate-melamine resin containing red pigment in dispersed form. The strip then passes a second time through the vacuum unit, where the metal layers and the acrylate layer are deposited in the same way as during the first pass.

Layer structure of the pigment

| Layer No. | Material | Layer thickness nm |
|---|---|---|
| 1 | chromium | 10 |
| 2 | acrylate | 350 |
| 3 | chromium | 11 |
| 4 | resin layer with red pigment | 950 |
| 5 | chromium | 10 |
| 6 | acrylate | 350 |
| 7 | chromium | 10 |

The layer system is detached from the substrate strip using acetone, is washed with acetone and is dried. subsequently the resulting pigment is heated at 300° C. in a stream of nitrogen for 90 minutes and is then comminuted to a particle size of from 20 to 40 μm in a Netsch mortar mill for 30 minutes, mixed with carbon dioxide dry ice, at from −5 to −10° C.

EXAMPLE 3

An interference pigment consisting of seven layers is produced by alternate vapor deposition of chromium and aluminum and magnesium fluoride onto a film of polyethylene terephthalate. The central layer (absorption layer), which consists of a black material, is produced by vapor deposition of a mixture of chromium and silicon dioxide. The starting material employed is a mixture of silicon dioxide and chromium which is marketed under the designation Schwarz A Pulverpatinal® by the company Merck KGaA. Vapour deposition is carried out in a high-vacuum vapor deposition unit A 700 Q from the company Leypold [sic] AG.

Layer structure of the pigment

| Layer No. | Material | Layer thickness nm |
|---|---|---|
| 1 | Cr | 5 |
| 2 | $MgF_2$ | 453 |
| 3 | Al | 10 |
| 4 | $SiO_2$/Cr | 90 |
| 5 | Al | 10 |
| 6 | $MgF_2$ | 453 |
| 7 | Cr | 5 |

Figure 2:
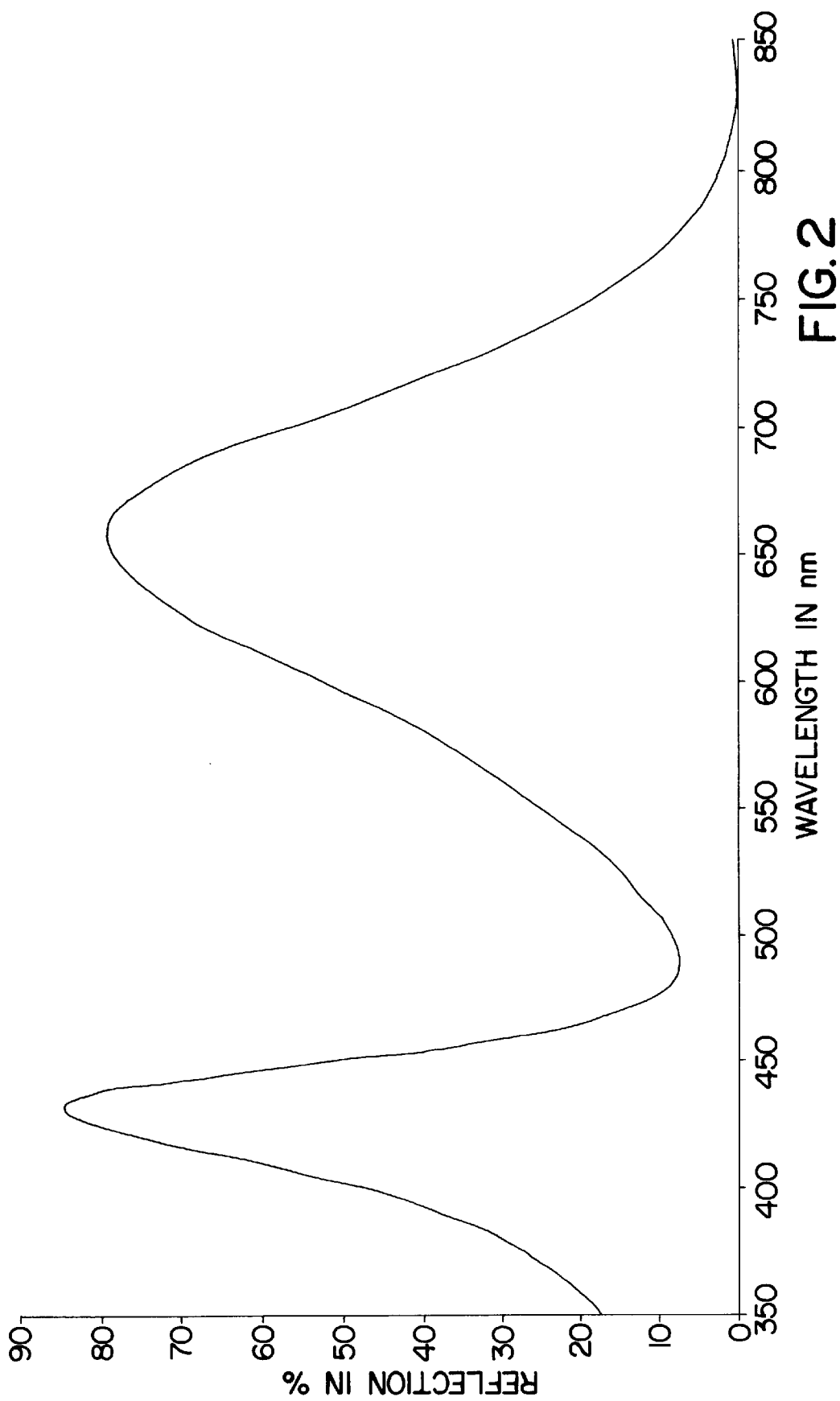

The layer system is detached with acetone from the film, is washed with acetone and dried, and is ground in a Netsch mortar mill for 30 minutes. A pigment having a mean particle size of 40 μm is obtained. The reflection spectrum is shown in FIG. 2.

EXAMPLE 4

An interference pigment consisting of five layers is produced by alternate vapor deposition of chromium and magnesium fluoride onto a film of polyethylene terephthalate. The central layer (absorption layer), which consists of a black material, is produced by vapor deposition of a mixture of chromium and silicon dioxide. The starting material employed is a mixture of silicon dioxide and chromium which is marketed under the designation Schwarz A Pulverpatinal® by the company Merck KGaA. Vapour deposition is carried out in a high-vacuum vapor deposition unit A 700 Q from the company Leypold [sic] AG.

Layer structure of the pigment

| Layer No. | Material | Layer thickness nm |
|---|---|---|
| 1 | Cr | 5 |
| 2 | $MgF_2$ | 453 |
| 3 | $SiO_2$/Cr | 90 |
| 4 | $MgF_2$ | 453 |
| 5 | Cr | 5 |

The layer system is detached with acetone from the film, is washed with acetone and dried, and is ground in a Netsch mortar mill for 30 minutes. A pigment having a mean particle size of 40 μm is obtained. The reflection spectrum is shown in FIG. 3.

What is claimed is:

1. A multilayer interference pigment comprising
    a central, absorbing layer which contains carbon black, color-imparting absorption pigments, or mixtures thereof, or high or low refractive index materials which contain metals, and, on either side thereof
    alternating layers comprising
        a layer of a low refractive index material comprising $MgF_2$, a polymer, $SiO_2$, or mixtures thereof, and
        a layer of metal or a layer of a material of high refractive index, said high refractive index material comprising $TiO_2$, $ZrO_2$, $Fe_2O_3$, $Cr_2O_3$, ZnO, or a mixture thereof, iron titanate, a titanium suboxide, a mixture thereof, or a mixed phase thereof.

2. An interference pigment according to claim 1, wherein said low refractive index material is an acrylate.

3. An interference pigment according to claim 1, wherein said layer of metal comprises aluminum, chromium, nickel, a Ni—Cr alloy or silver.

4. A multilayer interference pigment as claimed in claim 1, wherein the difference in refractive indices between the alternating layers is at least 0.1.

5. A multilayer interference pigment as claimed in claim 1, wherein the low refractive index layer has a thickness of between 20 nm and 700 nm.

6. An interference pigment according to claim 1, wherein said metal layer is present and further comprising an additional metal layer, with the low index of refraction material therebetween.

7. A pigmented composition, comprising a pigment according to claim 1, and at least one carrier.

8. A composition according to claim 7, wherein the pigments are employed as mixtures with conventional pigments and with other special-effect pigments.

9. A composition as claimed in claim 7, wherein the carrier comprises a paint, printing ink, plastic, or cosmetic.

10. A multilayer interference pigment comprising
    a central, absorbing layer which contains carbon black, color-imparting absorption pigments, or mixtures thereof, or materials of high or low refractive index which contain metals, and, on both sides thereof
    an alternating layer, said alternating layer comprising
        a first layer of a first material, said first material comprising a metal,
        a second layer of a second material, said second material being of low refractive index and comprising $MgF_2$, a polymer, $SiO_2$, or mixtures thereof, and
        a third layer of a third material, said third material also comprising a metal.

11. An interference pigment according to claim 10, wherein said second material is an acrylate.

12. An interference pigment according to claim 10, wherein each of said metal layers may independently be aluminum, chromium, nickel, a Ni—Cr alloy or silver.

13. A process for preparing an interference pigment comprising
    applying a release layer comprising a water- or solvent-soluble material to a substrate,
    depositing upon said release layer a layer system comprising a central layer of an absorbing material and alternating layers of a material of low refractive index and of a metal or of a material of high refractive index, removing said layer system from the substrate by dissolving the release layer to form a platelet-shaped interference pigment,
    washing and drying said platelet-shaped interference pigment,
    heat treating the platelet-shaped interference pigment at from 100 to 300° C. in a stream of nitrogen, and
    milling and classifying the heat-treated pigment.

14. A process according to claim 13, wherein the material of low refractive index is $MgF_2$, a metal oxide or a polymer.

15. A process according to claim 14, wherein the polymer is an acrylate.

16. A process according to claim 14, wherein the metal oxide is $SiO_2$, $Al_2O_3$ or a mixture thereof.

17. A process according to claim 13, wherein the metal is aluminum, chromium, nickel, a Ni—Cr alloy or silver.

18. A process according to claim 13, wherein the material of high refractive index is $TiO_2$, $ZrO_2$, $Fe_2O_3$, $Cr_2O_3$, ZnO or a mixture of these oxides or is an iron titanate, a titanium suboxide or a mixture or mixed phase of these compounds.

19. A process according to claim 13, wherein the central absorbing layer comprises a coating system which includes carbon black, color-imparting absorption pigments or mixtures thereof.

* * * * *